United States Patent Office.

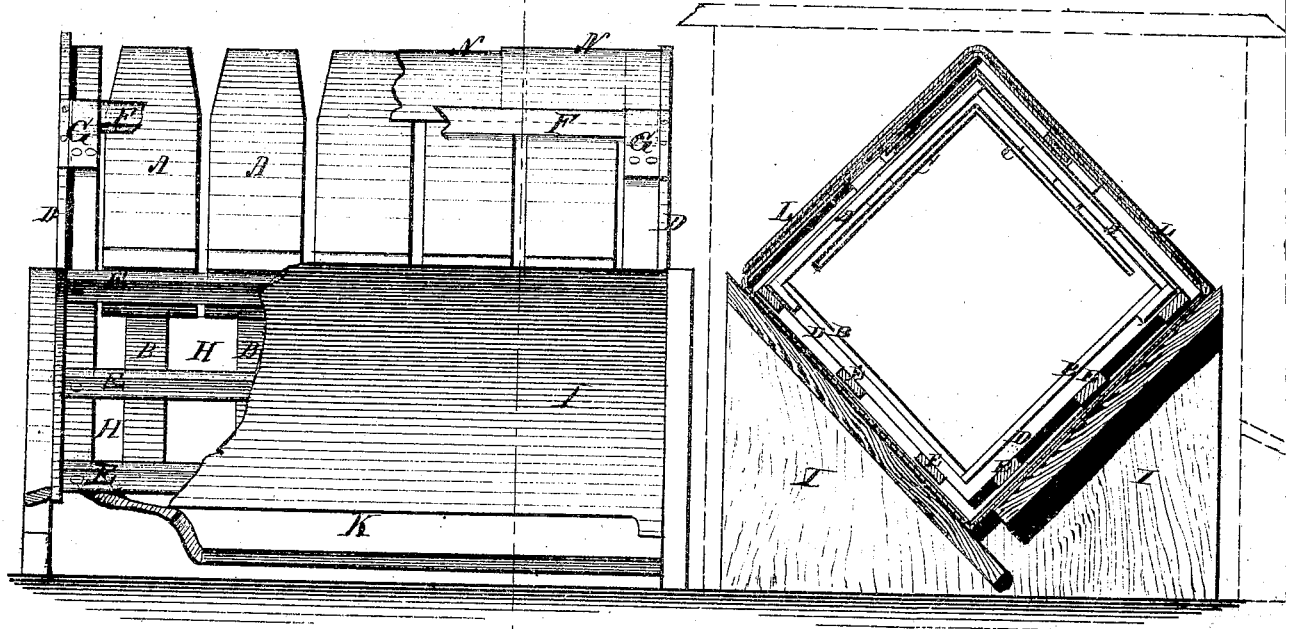
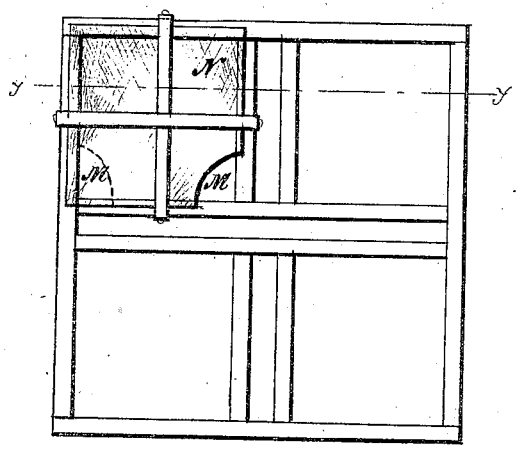
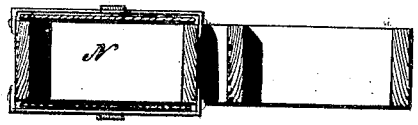

JOHN M. PRICE, OF BUFFALO GROVE, IOWA.

Letters Patent No. 101,039, dated March 22, 1870.

IMPROVEMENT IN BEE-HIVES.

The Schedule referred to in these Letters Patent and making part of the same

*To all whom it may concern:*

Be it known that I, JOHN M. PRICE, of Buffalo Grove, in the county of Buchanan and State of Iowa, have invented a new and useful Improvement in Bee-Hives; and I do hereby declare that the following is a full, clear, and exact description thereof, which will enable others skilled in the art to make and use the same, reference being had to the accompanying drawings forming part of this specification.

This invention relates to improvements in bee-hives, and consists in a hive made of sections, consisting of four slats or bars attached at the corners in rectangular form, two of which are wider than the others, and provided at the inside with slats for the comb-bars; the said sections being confined in a rack or casket, and laid on a platform having a deep angular groove in which the hive is laid on one corner, and may be turned from time to time as may be required.

The hive so constructed is designed to be wrapped in cold weather with canvas, and the whole is inclosed in an exterior case, all as hereinafter more fully specified.

Figure 1 is a side elevation, partly broken out;

Figure 2 is a transverse section taken on the line *x x* of fig. 1;

Figure 3 represents a modified arrangement of one of the sections, showing the application of glass cells into which the sections may be divided; and Figure 4 represents a transverse section taken on the line *y y* of fig. 3.

Similar letters of reference indicate corresponding parts.

A represents the upper wide slats of the sections, and B the lower ones. These are connected together at the ends so as to form a hollow square; and the upper wide slats have at the under sides the narrow slats C attached so as to project slightly, on which to form the comb.

These sections are placed side by side, as many as may be required, and confined in a casket or rack composed of the two end boards D, connected by the longitudinal slats E, permanently attached to the under or lower edges. They are confined in this casket by the upper longitudinal bars F, dropped behind the plates G after the sections are put in place.

This arrangement provides the wide open spaces H between the lower slats for the discharge of foul matter, dead bees, and the like, from the space above; and the hive is placed in the V-shaped support I, at the bottom of which is a passage, K, along the whole length, for the escape of the said matters.

The upper ends of the wide slats A of the sections are tapered to provide space for ventilation, when standing in the position represented in the drawings; also to admit the escape of foul matter when the position is reversed, which I propose to do from time to time for the purpose of stimulating the queen to breed, and the colony to work, which is caused by the change of the interior position.

The bees may enter above or below, or at the ends through holes prepared for the purpose in the boards D, when the season is favorable to permit of these openings; but in cold weather I propose to wrap a canvas covering, L, around the sides of the hive, as shown in the end view, fig. 2, making the same of the proper length to cover the two lower sides once and the two upper sides twice, as clearly shown.

The hive may also be laid flat on the side on a suitable support, if preferred, from time to time, as it is changed in position for stimulating the bees.

I propose to substitute for the internal sections when required, either a part or the whole as found best, sections such as represented in fig. 3, with glass boxes or cells N for the reception of the spare honey, the said cells being provided with openings, M, at the corners or in other suitable places, for the admission of the bees.

The said sections with glass cells may be placed at the ends of the hive, and the sections within the casket retained.

The upper sections may be closed, when desired, by angle-plates N laid on as shown in fig. 1.

By means of this improved hive I am enabled to preserve the bees in cold weather by wrapping the canvas cover around them, much better than can be done by the hives now in use.

Having thus described my invention,

I claim as new and desire to secure by Letters Patent—

1. The combination of the hive composed of the casket and internal sections, as described, and the V-shaped base adapted for turning the hive and supporting it in the angular position, all substantially as specified.

2. The internal sections composed of the wide bars A tapered at the top, the narrow bars B, and the projecting comb-bars C, all substantially as specified.

JOHN M. PRICE.

Witnesses:
LORIN D. CARPENTER,
E. K. JENKS.